No. 788,256.

Patented April 25, 1905.

UNITED STATES PATENT OFFICE.

HANS FOERSTERLING AND HERBERT PHILIPP, OF PERTH AMBOY, NEW JERSEY, ASSIGNORS TO THE ROESSLER & HASSLACHER CHEMICAL COMPANY, OF NEW YORK, N. Y., A CORPORATION.

PROCESS OF OBTAINING OXYGEN FROM ALKALI PEROXID.

SPECIFICATION forming part of Letters Patent No. 788,256, dated April 25, 1905.

Application filed February 5, 1904. Serial No. 192,131.

*To all whom it may concern:*

Be it known that we, HANS FOERSTERLING, a subject of the Emperor of Germany, and HERBERT PHILIPP, a subject of the King of Great Britain, both residents of Perth Amboy, county of Middlesex, State of New Jersey, have invented a certain new and useful Process of Obtaining Oxygen Gas from Alkali Peroxid, of which the following is a specification.

This invention relates to a process for obtaining oxygen gas from an alkali peroxid wherein a solidified fused mass of alkali peroxid is brought into contact with certain liquids or solutions, whereby it will produce oxygen gas, and has for its object to cheapen and facilitate the production of said gas.

It is at present customary in producing oxygen from alkali peroxids to prepare the alkali peroxids by pulverizing and mixing the same with certain suitable salts and compressing this mixture, then bringing the compressed alkali peroxid and salt into contact with water, whereby the oxygen gas is produced. Such pulverized and compressed alkali peroxid readily disintegrates and loses its efficiency for producing oxygen and is liable to cause inconvenience in manipulating the same.

We have discovered that by fusing an alkali peroxid—for example, sodium peroxid—in a suitable crucible until the contents of the crucible are thoroughly molten and homogeneous and cooling the same in molds of any desirable form or shape we obtain the same in a very compact form, which will not disintegrate and which has the property of instantly evolving oxygen gas when brought into contact with water or other suitable liquid or solution. By fusing the alkali peroxid the molecules of the same are forced into such close proximity to each other that a continuous production of oxygen gas, as per the following equation $$2Na_2O_2 + 2H_2O = 4NaOH + O_2,$$

is obtained, and the heat necessary for the evolving of the gas is effected through a local superheating caused by the close proximity of the molecules of the prepared alkali peroxid one to the other.

It is obvious that any suitable matter may be added to the alkali peroxid during any stage in the process of its preparation as may be desired.

What we claim as our invention, and desire to secure by Letters Patent of the United States, is—

1. The process of obtaining oxygen gas from an alkali peroxid consisting in the bringing of a solidified, fused mass of alkali peroxid into contact with any suitable liquid, as and for the purpose described.

2. The process of obtaining oxygen gas from an alkali peroxid consisting in the bringing of a solidified, fused mass of alkali peroxid into contact with water, as and for the purpose described.

3. The process of obtaining oxygen gas from fused sodium peroxid consisting in bringing a solidified, fused mass into contact with any suitable liquid, as and for the purpose described.

4. The process of obtaining oxygen gas from fused sodium peroxid consisting in bringing the solidified, fused mass into contact with water, as and for the purpose set forth.

In witness whereof we have hereunto signed our names in the presence of the two subscribing witnesses.

HANS FOERSTERLING.
HERBERT PHILIPP.

Witnesses:
 MILTON KUTZ,
 FRANZ ROESSLER.